US012085259B2

(12) United States Patent
Jones

(10) Patent No.: US 12,085,259 B2
(45) Date of Patent: Sep. 10, 2024

(54) DEVICE, SYSTEM, AND METHOD OF PROVIDING A LAMPSHADE INSERT FOR APPLYING AN ARTISTIC MEDIUM

(71) Applicant: Design and Deliver, LLC, Charlotte, NC (US)

(72) Inventor: Robert Jones, Charlotte, NC (US)

(73) Assignee: Design and Deliver, LLC, Charlotte, NC (US)

( * ) Notice: Subject to any disclaimer, the term of this patent is extended or adjusted under 35 U.S.C. 154(b) by 0 days.

(21) Appl. No.: 17/930,972

(22) Filed: Sep. 9, 2022

(65) Prior Publication Data

US 2024/0084993 A1 Mar. 14, 2024

(51) Int. Cl.

*F21V 1/12* (2006.01)
*F21V 1/22* (2006.01)
*F21V 1/26* (2006.01)
*F21V 1/17* (2018.01)
*F21W 121/00* (2006.01)

(52) U.S. Cl.

CPC .................. *F21V 1/12* (2013.01); *F21V 1/22* (2013.01); *F21V 1/26* (2013.01); *F21V 1/17* (2018.02); *F21W 2121/00* (2013.01)

(58) Field of Classification Search

CPC ..... F21V 1/12; F21V 1/22; F21V 1/26; F21V 1/17

See application file for complete search history.

(56) References Cited

U.S. PATENT DOCUMENTS 1,558,449 A * 10/1925 Andrews .................. F21V 1/14 428/497
3,022,417 A * 2/1962 Linderoth ................. F21V 1/06 362/358
4,827,382 A * 5/1989 Feliks ........................ F21V 1/10 446/210
5,211,474 A * 5/1993 Leitner ..................... F21V 1/26 362/357
5,833,349 A * 11/1998 Apple ........................ F21K 2/00 362/311.04

(Continued)

FOREIGN PATENT DOCUMENTS

DE 202018101591 * 5/2018 ................ F21V 1/22
GB 2297946 * 8/1996 ............. B32B 27/12

(Continued)

*Primary Examiner* — Zheng Song

(74) *Attorney, Agent, or Firm* — TechLaw Ventures, PLLC; Terrence J. Edwards

(57) ABSTRACT

An insert device for receiving an artistic medium thereon for use with a lampshade. The device may include an insert configured to be used in association with a lampshade. The insert may include a first side and a second side. A design may be located on the first side of the insert, where the insert with the design is configured to be drawn on using an artistic implement. The insert may be made from a translucent material that is capable of receiving and retaining an artistic medium thereon. The artistic medium can be erased or otherwise removed from the translucent material. The design on the insert may be used in association with a lampshade such that it is exposed for viewing in association with the lampshade when the insert is in a three-dimensional shape.

30 Claims, 15 Drawing Sheets

(56) References Cited

U.S. PATENT DOCUMENTS

| | | | | | |
|---|---|---|---|---|---|
| 6,010,235 | A * | 1/2000 | Sawyer | B44C 3/12 362/311.03 |
| 6,729,747 | B1 * | 5/2004 | Wirayani | F21V 1/14 362/361 |
| 7,347,593 | B1 * | 3/2008 | Swanson | F21V 1/26 362/357 |
| 8,596,833 | B1 * | 12/2013 | Cytrynowicz | F21S 6/002 156/218 |
| 2003/0218883 | A1 * | 11/2003 | Thevenot | B44C 5/005 362/362 |
| 2005/0016667 | A1 * | 1/2005 | Dwight | F21V 1/26 156/218 |
| 2010/0309670 | A1 * | 12/2010 | Brown | F21V 1/16 362/358 |
| 2012/0239521 | A1 * | 9/2012 | Acworth | F21S 6/005 705/26.5 |
| 2013/0155692 | A1 * | 6/2013 | Federici | F21V 17/105 29/428 |
| 2013/0201695 | A1 * | 8/2013 | Lewis | F21V 17/002 29/458 |
| 2016/0238213 | A1 * | 8/2016 | Kimmet | F21V 1/04 |
| 2017/0027361 | A1 * | 2/2017 | Santiago | F21V 1/04 |
| 2019/0338912 | A1 * | 11/2019 | Jones | F21V 1/143 |

FOREIGN PATENT DOCUMENTS

| | | | | |
|---|---|---|---|---|
| GB | 2513254 | * | 10/2014 | F21V 1/143 |
| WO | WO 02/18838 | * | 3/2002 | F21V 1/26 |
| WO | WO 2016079548 | * | 5/2016 | A47G 33/06 |

* cited by examiner

DEVICE, SYSTEM, AND METHOD OF PROVIDING A LAMPSHADE INSERT FOR APPLYING AN ARTISTIC MEDIUM

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present disclosure relates generally to inserts for applying an artistic medium and more particularly relates to inserts for applying an artistic medium for use in connection with lampshades, lampshade systems, and the assembly of lampshade systems.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where.

DETAILED DESCRIPTION

Figure 1:
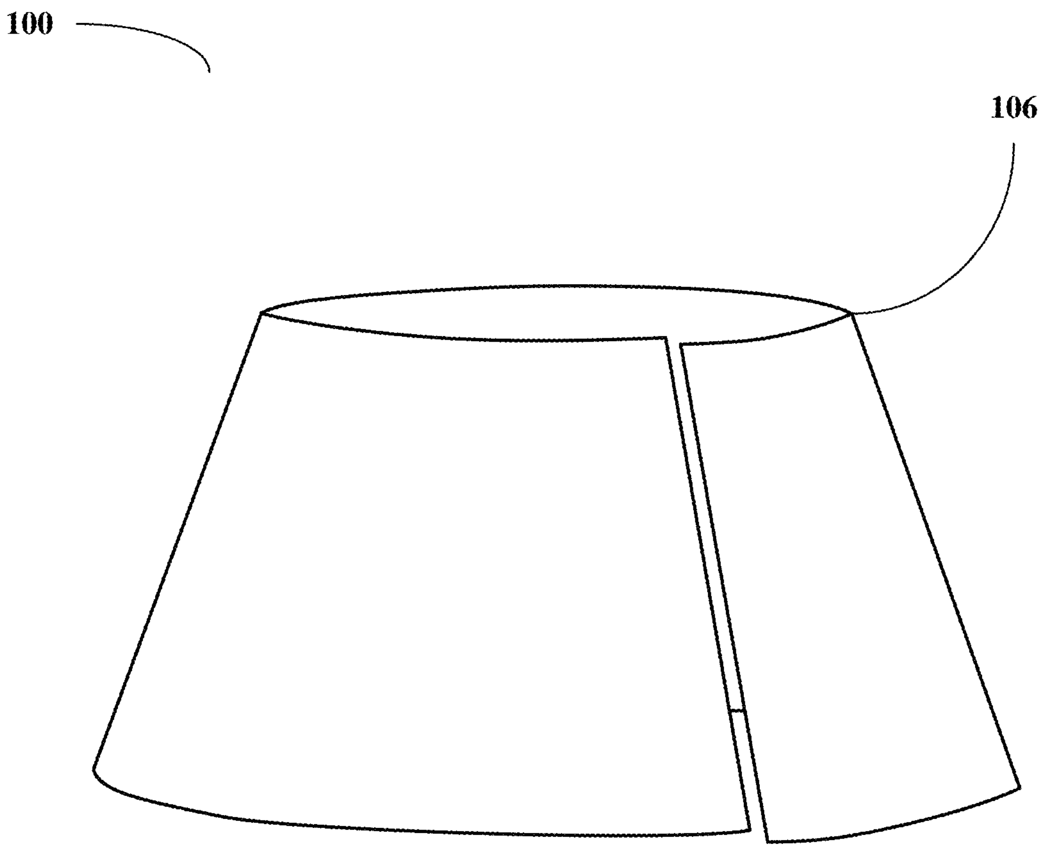
FIG. 1 is a perspective view of a customizable lampshade insert device according to the principles of the present disclosure.

Typically, traditional lampshades are plain fabric or equivalent material and used to manage the output of a lamp light source. Applicant has recognized a need for a customizable lampshade insert with decorative elements of lampshades suited to a customer's tastes that can be uniquely customizable, interchangeable, and easily replaceable without tools. These inserts could be used in conjunction with a lampshade or used as a standalone device. For example, embodiments disclosed herein may prevent requiring users to purchase an entirely new lamp when they want a new lampshade look.

In light of the foregoing, Applicant has devices, systems, and methods of use for interchangeable, customizable lampshade inserts. These inserts and the designs thereon may be printed on materials such as polypropylene, styrene, or other pliable but semi-rigid substrates. For example, substrates may include materials previously used as backing material substrates for fabric lampshades. These substrates allow printing using the capabilities and creativity of a commercial printer.

Designs may be printed on digital printers, off-set printers, and cyan, magenta, yellow, and key (CYMK) printers using ultraviolet (UV) inks, glow in the dark inks, three-dimensional printing, and/or and lenticular printing processes. The lampshade inserts are thus only constrained by the type and size of printer used or available for printing the designs. In one embodiment, inserts are printed using a printer whose max print images size is 39.5 inches by 28.35 inches (or 997 mm by 720). The substrates and inks may include safe materials, which can be determined based on material safety data sheets (MSDS) for the materials used for the substrate, printed designs, fasteners, or other parts of the lampshade wraps or covers.

Printing directly on rigid or semi-rigid substrates allows for the creation of unique, one of a kind designs such as glow in the dark shade inserts, three-dimensional design inserts, lenticular inserts, pre-printed inserts, and do it yourself inserts. The unique printing process also allows for fastening means, such as fasteners and slots on the inserts, or hooking means using hook and loop (Velcro) tape or matched pole magnetic tape. In some implementations connection means can be adhered to the insert using a glue or adhesive.

The systems and methods disclosed herein may enable interchangeable and releasable lampshade inserts. Furthermore, manufacturing embodiments may enable affordable design and manufacturing of lampshade inserts so that consumers can easily and affordably change out an insert to suit their tastes. Consumers may be able to easily interchange and replace lampshade inserts to obtain a new look for a lamp without replacing the lamp and without requiring the use of tools.

A detailed description of devices, systems, and methods consistent with embodiments of the present disclosure is provided below. While several embodiments are described, this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

Turning to the figures, FIG. 1 shows a lampshade insert device 100 in a three-dimensional shape. The lampshade insert device 100 may comprise a semi-rigid material with a printed pattern thereon. In one implementation, the insert may have a securing means thereon to retain the three-dimensional shape 106. Securing means may include fasteners, Velcro, adhesive, magnetic tape, or other comparable securing means. The insert may be rigid enough resist manipulation into a three-dimensional shape 106, but may retain that shape once manipulated and secured.

Figure 2A:
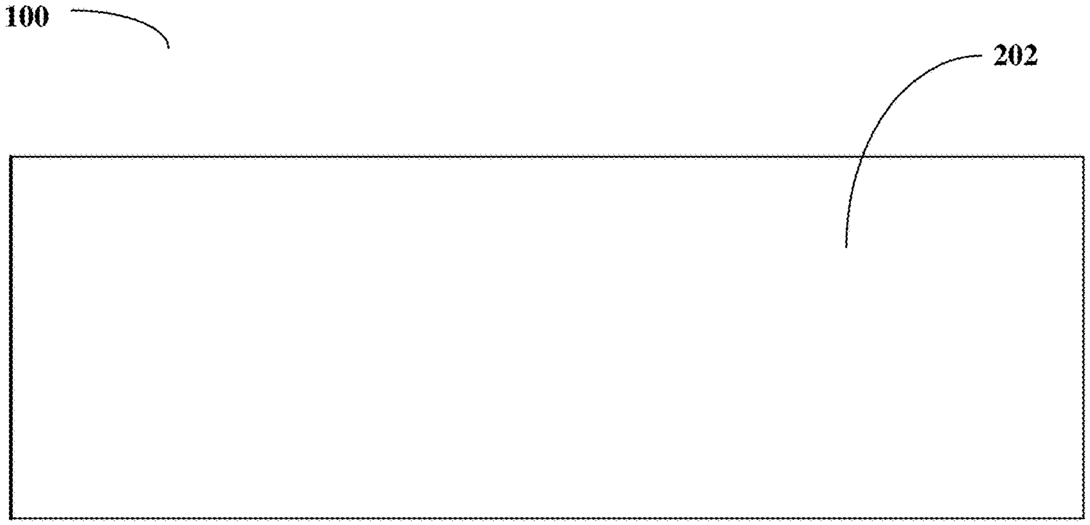
FIG. 2A is a is an overhead view of an exemplary rectangular configuration of a lampshade insert device according to the principles of the present disclosure.
Figure 2B:
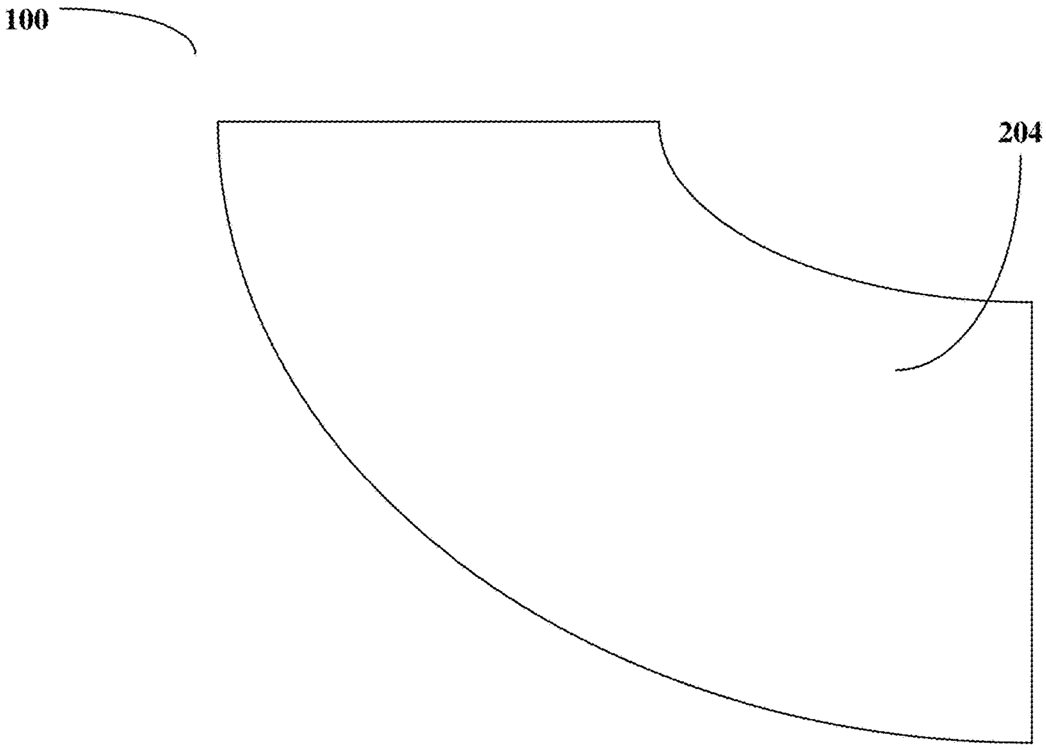
FIG. 2B is an overhead view of an exemplary annular configuration of a lampshade insert device according to the principles of the present disclosure.

FIGS. 2A and 2B show different configurations of a customizable lampshade insert device 100. In one implementation seen in FIG. 2A, a customizable lampshade insert device 100 may have a default, flat state resembling a substantially rectangular shape 202. In another implementation seen in FIG. 2B, a customizable lampshade insert device may have a default, flat state resembling a partially-annular shape 204. While these specific configurations are shown in figures, they are not the only shapes contemplated. Other configurations may resemble common commercial lampshade shapes, such as bell, coolie, drum, empire, hexagon, square, or other shapes. While the insert is referred to as a lampshade insert for convenience, other sizes and shapes of a lampshade insert device are contemplated, and such inserts could be used as larger backlit wall ornaments, smaller nightlight covers, or other sizes and shapes suitable for other purposes.

Figure 2C:
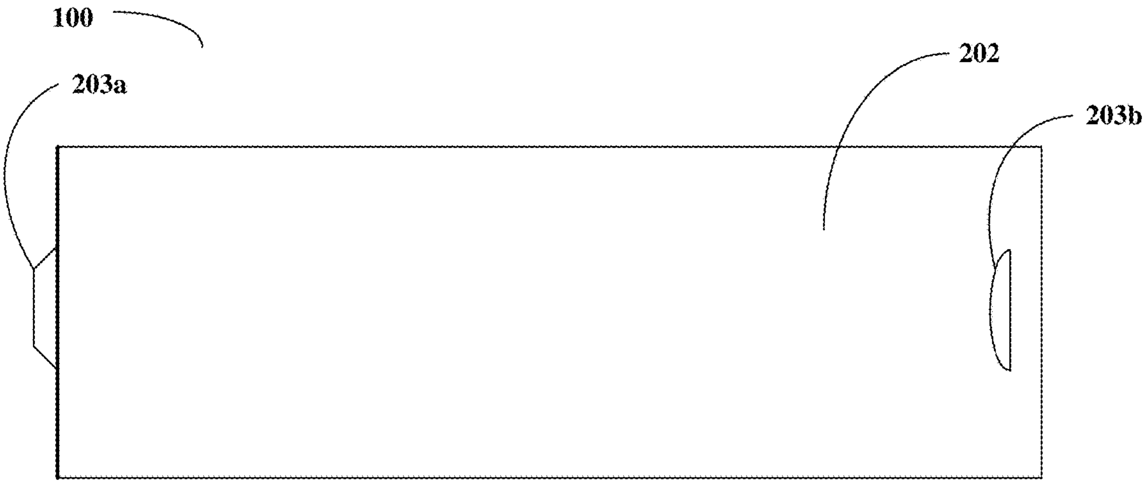
FIG. 2C is an overhead view of an exemplary rectangular configuration of a lampshade insert device featuring a fastener and slot according to the principles of the present disclosure.
Figure 2D:
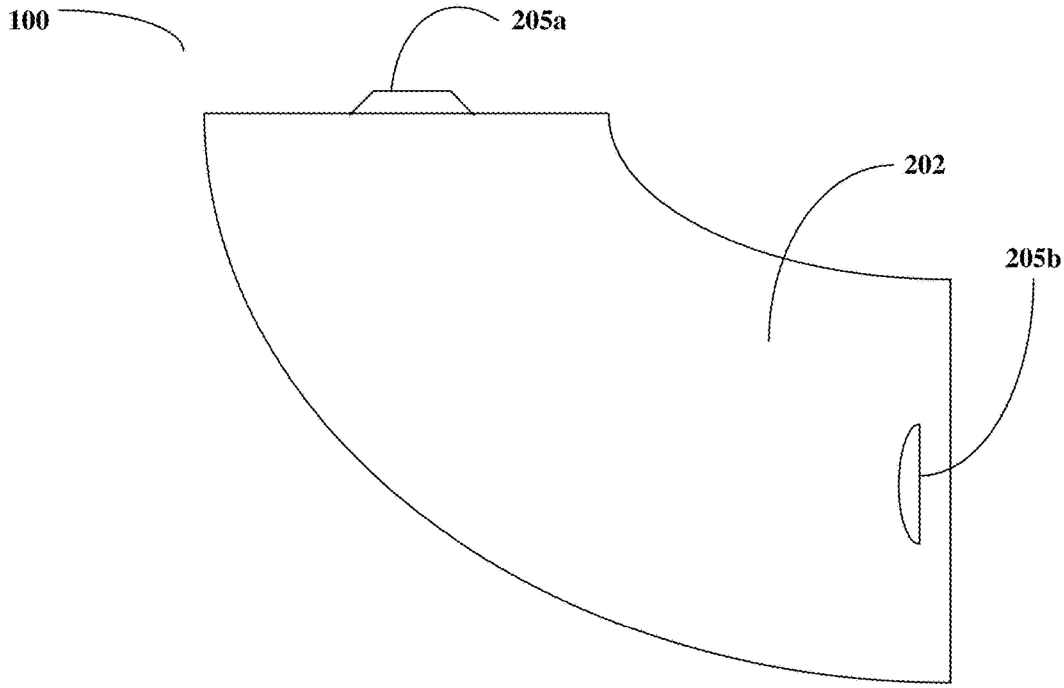
FIG. 2D is an overhead view of an exemplary annular configuration of a lampshade insert device featuring a fastener and slot according to the principles of the present disclosure.

FIGS. 2C and 2D show alternative implementations of a lampshade insert device 100 featuring securing means described above. One implementation having a substantially rectangular shape 202 may feature a fastener 203*a* on one end and a slot 203*b* for receiving the fastener 203*a* on an opposite end of the lampshade insert device 100. The fastener 203*a* may join with the slot 203*b* when the lampshade insert device 100 is manipulated into a three-dimensional shape as seen in FIG. 1 such that the device 100 retains that shape. While implementations shown here only feature one fastener and one slot, one skilled in the art will appreciate multiple fasteners corresponding to multiple slots are contemplated. Similarly, an implementation having a partially-annular shape may also feature a fastener 205*a* and corresponding slot 205*b*.

The lampshade insert devices shown in any of FIGS. 2A-2D may be used or stored in a flattened configuration. The flattened configuration may allow for extremely dense storage, which may allow for reduced storage and shipping costs. Flattened configurations may be conducive to shipping large numbers of lampshade insert devices in the same container or box. For individual shipping of lampshade insert devices, or shipping a small number of lampshade insert devices, the flattened configuration may be undesirable. For example, if a lampshade insert device is sold in a single pack or a triple pack, the dimensions of the flattened configuration may be undesirable. In one implementation, lampshade covers may be individually packaged or packaged in small numbers by rolling up each lampshade insert device. This reduces the horizontal dimensions of the lampshade insert device. Because the lampshade insert devices are formed from sheets thin enough to bend, they may be rolled in some implementations, but in others the lampshade insert devices may be thick enough to provide rigidity and retain a three-dimensional shape.

Figure 3A:
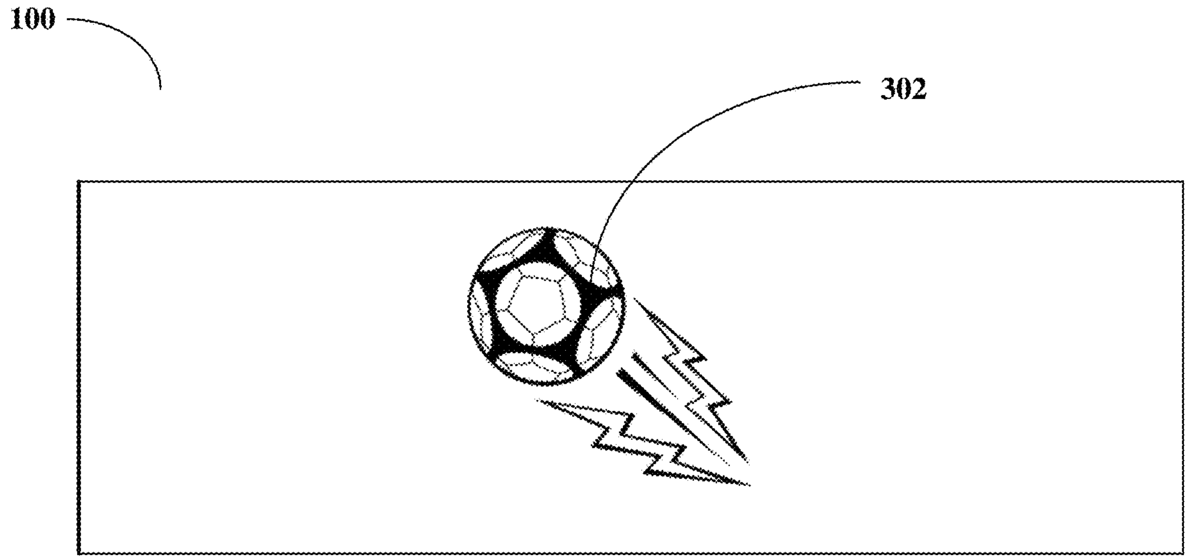
FIG. 3A is an overhead view of a lampshade insert device first side having an image graphic thereon according to the principles of the present disclosure.
Figure 3B:
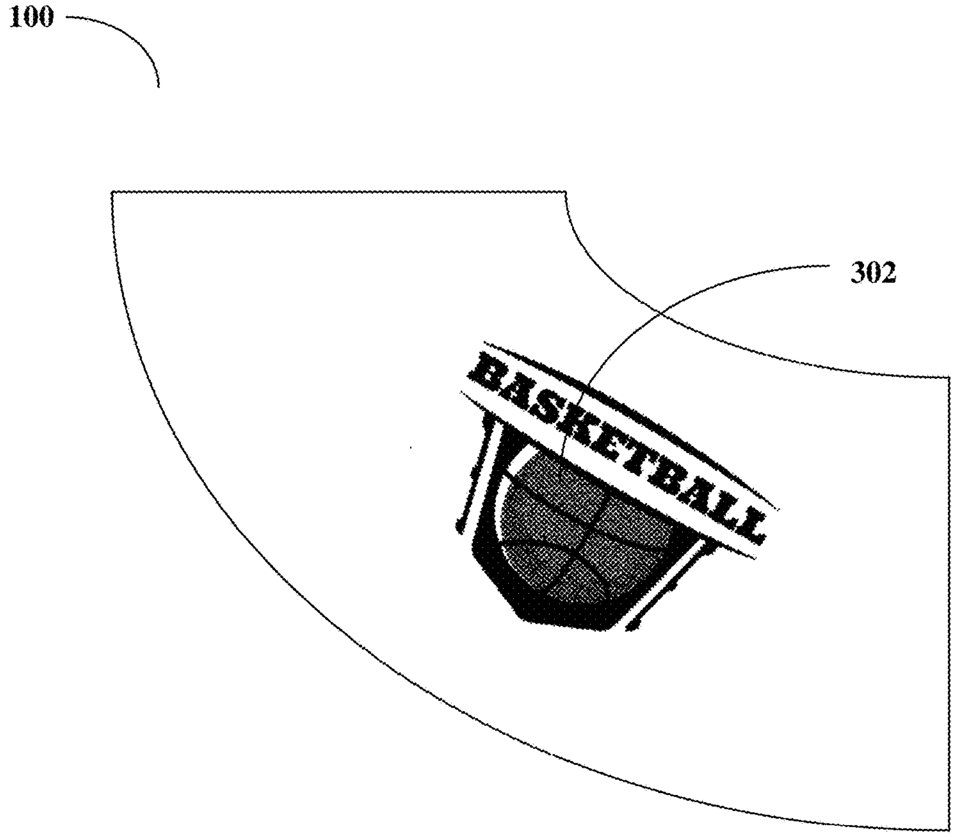
FIG. 3B is an overhead view of a lampshade insert device first side having an image graphic thereon according to the principles of the present disclosure.

FIGS. 3A and 3B show a first and second side of a lampshade insert device 100 according to the principles of the present disclosure. In one implementation, a first side may have a design 302 located or printed thereon. A user may prefer to have a design 302 representing a favorite sports team, brand, country, or other identifying image, which can be colored, painted, or otherwise marked or drawn on. A second side may not have a design 302 thereon, but may still be colored, painted, or otherwise drawn or marked on via an artistic implement.

In one implementation, a design 302 may be located or printed on a first surface of the lampshade insert device. A design 302 may be a pattern image printed on one or both sides of a lampshade insert device 100 that can be colored, painted, or otherwise marked or drawn on. The design 302 may only be printed one side to avoid scraping or scratching the design during packaging, shipping, and/or installation, but in some implementations, a design may be printed on both sides. In one implementation, the design 302 may only be printed on one side, but still visible from an opposite surface due to a transparent or semitransparent substrate. In another implementation, the design 302 is opaque or semi-transparent to avoid glare from shining through a lampshade insert device when installed.

While sports designs are shown as possible implementations in FIGS. 3A and 3B, any design may be printed on an insert using any known printing process. Example printing processes may be used including ultraviolet (UV) printing, lenticular printing, or the like. The insert design may be printed in a variety of ways. UV printing is different from conventional printing in many ways. Instead of having solvents in an ink that evaporate into the air and absorb into paper (or other substrate), UV inks, pastes, or powders dry through a photomechanical process. When the inks are exposed to ultraviolet radiation they turn from a liquid, or paste, to a solid. There is significantly less evaporation of solvents and much less absorption of the ink into the stock.

A design may be printed using CMYK inks to provide full color and high quality appearance and design. In some cases, almost any desired appearance can be achieved due to high dot-per-inch printing. In one implementation, a lampshade insert device may be printed with glow in the dark ink or powder as part of the design. For example, a glow in the dark lampshade insert device may be printed using an UV glow in the dark ink with a gloss varnish. The glow-in-the-dark material may be applied over a full surface of the insert or may be spot printed to provide a glow-in-the-dark effect only at specific locations. In one embodiment, a combination of glow-in-the-dark and CMYK printing may be performed to provide both color and glow-in-the-dark effects to a design. Glow-in-the-dark or glowing effects may be achieved using luminescent or florescent materials. Luminescent material absorbs energy and emits this as light. This can happen either immediately or over a period of time, such as after a light source is turned off. This light emission, or excitation energy, is called luminescence and does not contribute to the thermal energy of the compound.

In some implementations, a design may be printed using latex printing. Latex printing is a printing process utilizing a latex ink comprising a synthetic polymer suspended globules suspended in fluid. When exposed to heat, the ink turns into a film in a process known as "curing." Heat used may range from a minimum of 50° F. to 60° F. to a maximum of 140° F. to 150° F. Latex printing is fast-drying, produces a durable image, and is environmentally friendly. The convenience of latex printing may allow users to custom print designs quickly and easily in some implementations. Users may upload image or photograph as a base for a custom design when placing an order for a lampshade insert device according to the principles of the present disclosure.

Figure 4A:
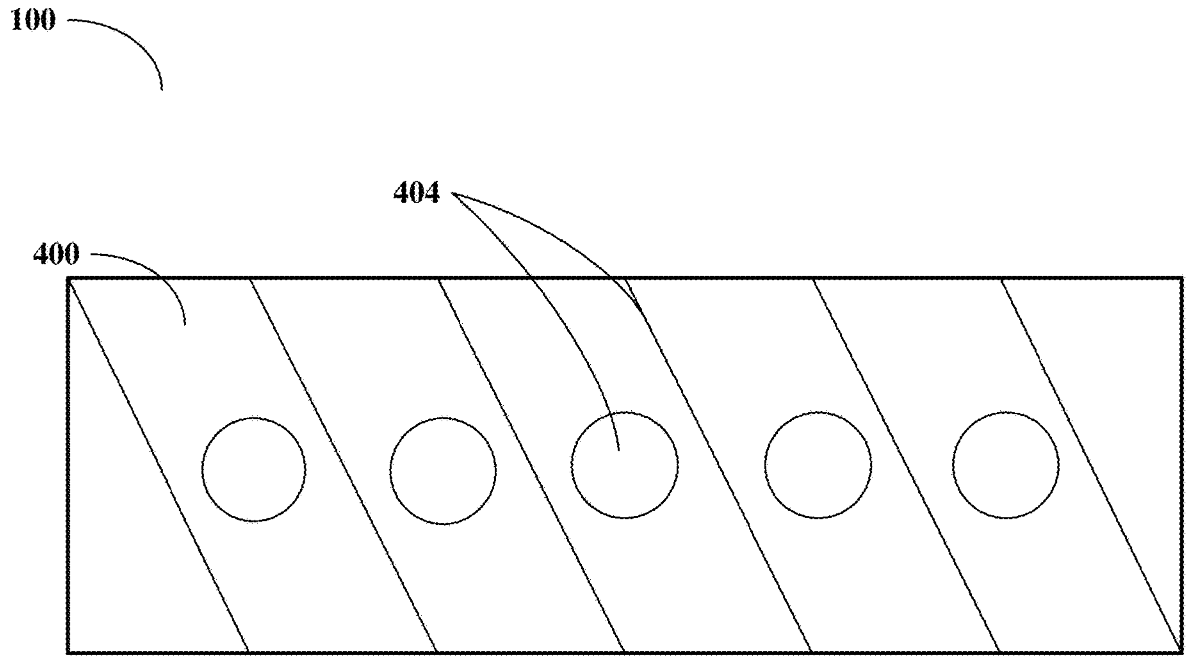
FIG. 4A is an overhead view of a lampshade insert device first side having a pattern graphic thereon according to the principles of the present disclosure.
Figure 4B:
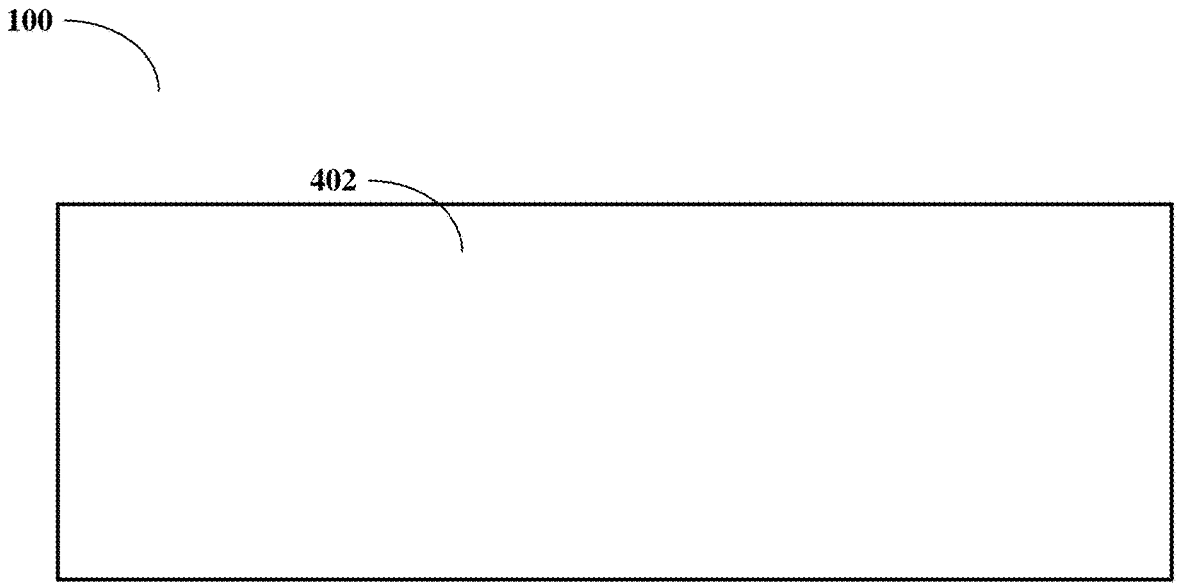
FIG. 4B is an overhead view of a lampshade insert device second side according to the principles of the present disclosure.

FIGS. 4A and 4B show two sides, a first side 400 and a second side 402 of a lampshade insert device 100 that may be drawn on. A lampshade insert device 100 may be printed with a pattern design 404 thereon that spans the length of the insert. This pattern design 404 may be printed on a first side 400 of the lampshade insert device 100 in some implementations, while in others the same design, a different design, or no design at all may be printed on a second side 402 of the lampshade insert device 100.

Figure 4C:
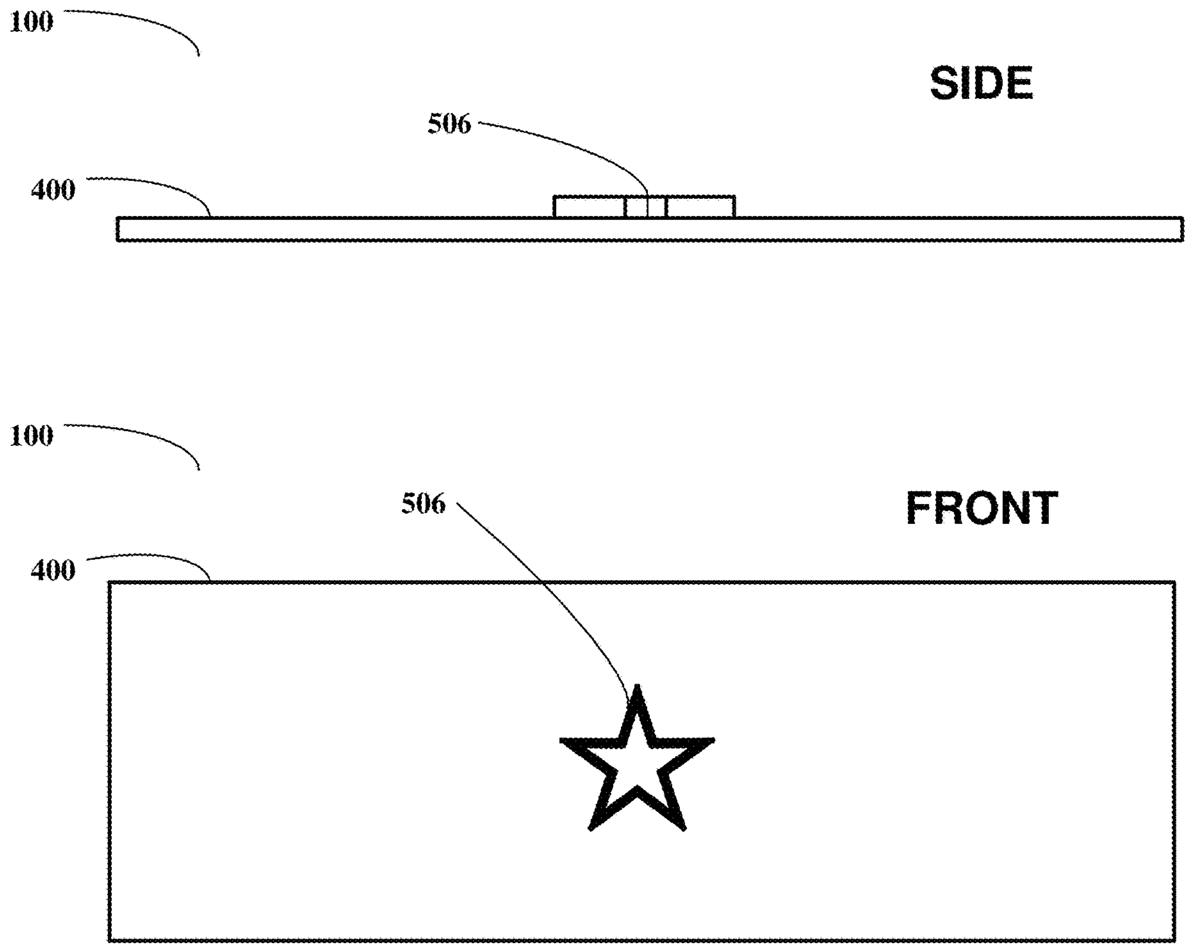
FIG. 4C is an overhead view and side view of a lampshade insert device featuring a three-dimensionally printed design thereon according to the principles of the present disclosure.

In one implementation, a printer may perform an additive three-dimensional printing on the lampshade insert device to provide a raised design with 3D effect, as shown in FIG. 4C. A lampshade insert device 100 may have a three-dimensional design 506 printed thereon by the additive printing process. Seen in the view labeled SIDE, the star design 506 is raised from the surface of the side 400 the design 506 is printed on. Note that the degree of the three-dimensional effect can vary according to the implementation, and the view labeled SIDE shown in FIG. 4C is exaggerated for the sake of showing the disclosed feature. More or less exaggerated three-dimensional shapes are possible according to the implementation. Three-dimensional shapes that extend upward from the insert may be built or printed by a 3D printer. Because the designs are meant to be bent or rolled when a lampshade insert device is disposed within a lampshade, there may be limit on the thickness and/or length/width of 3D feature. However, a desired appearance or texture may be imparted to a design with the help of three dimensional features.

Figure 4D:
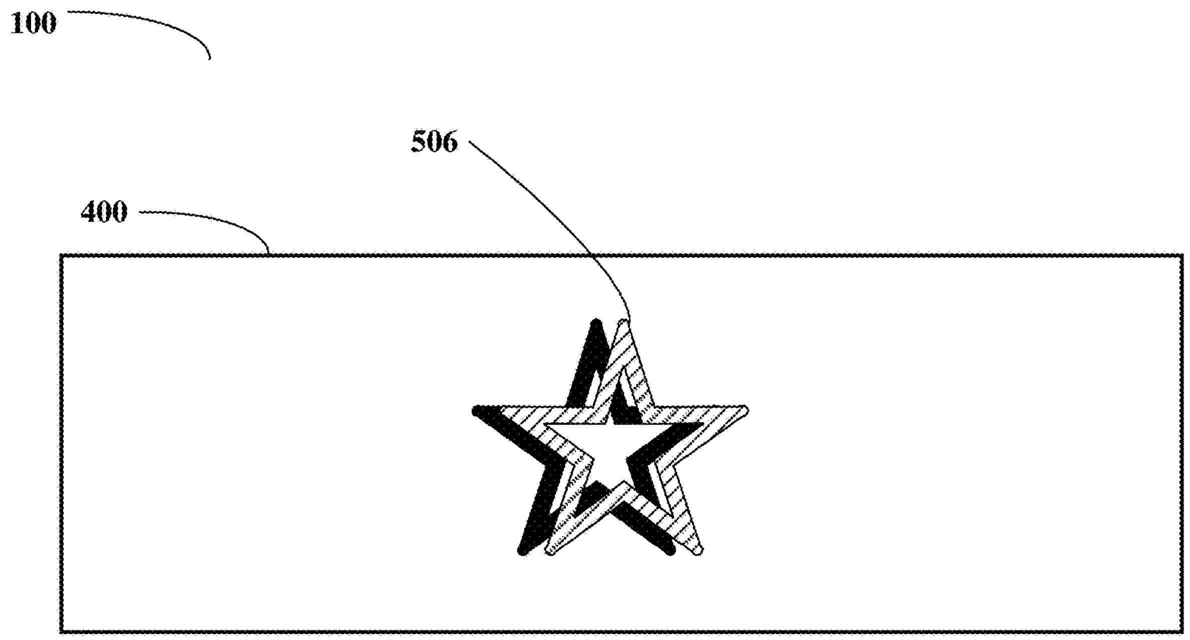
FIG. 4D is an overhead view of a lampshade insert device featuring a lenticularly printed design thereon according to the principles of the present disclosure.

In other implements, a design may be printed on a lampshade insert device by lenticular printing. In lenticular printing, two or more different images are loaded into a computer graphics program. By way of example, two images may be used. Shown in FIG. 4D, two star images may be loaded to create design 506. The program cuts each image into dozens of thin strips and weaves them together so the strips from the first image alternate with the strips from the second. This process is called interlacing. This interlaced image is printed and a transparent plastic layer is printed/placed on top of the interlaced or doubled-up image. The transparent plastic layer is made of dozens of separate thin, hemi-spherical lenses called lenticles. These refract (bend) the light passing through them so that a viewer sees only half (or some other number) of the printed strips. If the user moves their head back and forth the image flips back and forth too like a kind of visual see-saw.

Each one is a hemispherical plastic lens that magnifies only one of the sliced images underneath it, depending on where the viewer's eyes are in relation to the printed image. Different lenticulars may have different pitches, which is the number of lenticles per inch (LPI). They also work differently at different distances from the viewer. Both these factors—the pitch and the viewing distance—should be considered to make a convincing lenticular print.

Figure 5A:
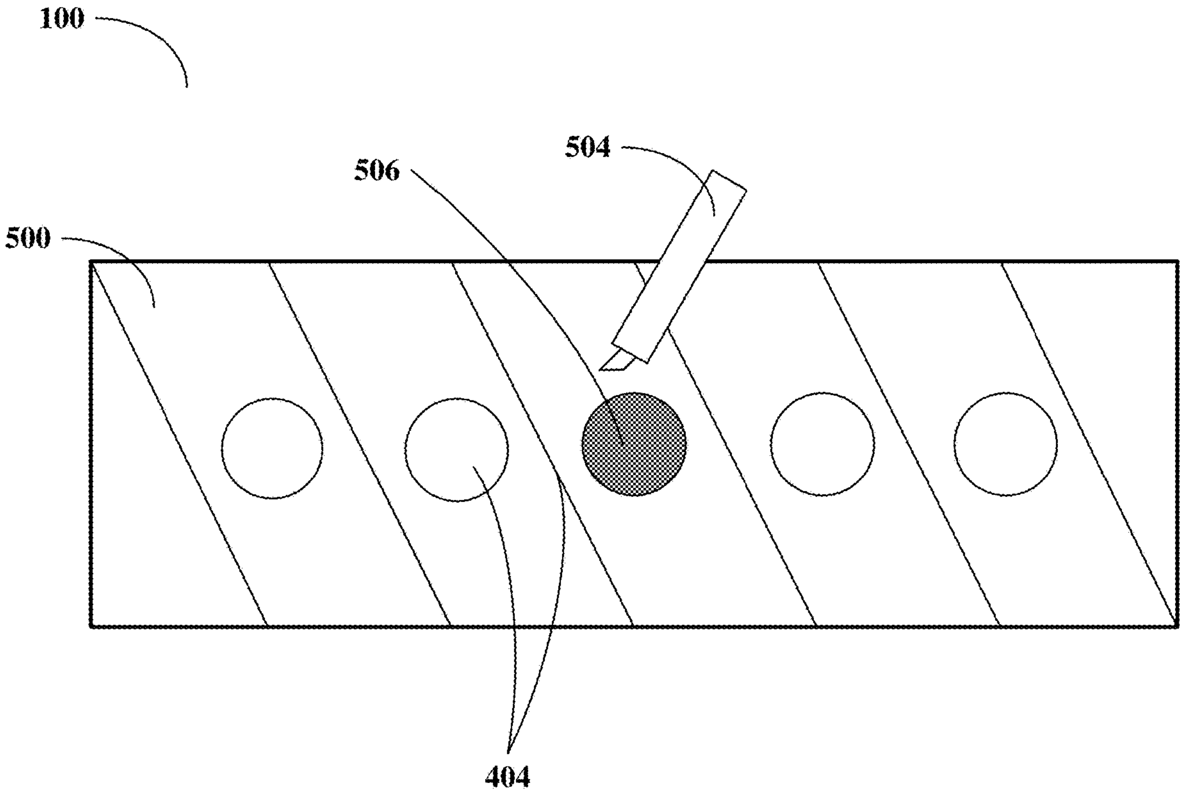
FIG. 5A is an overhead view of a lampshade insert device first side being drawn on via an artistic implement according to the principles of the present disclosure.
Figure 5B:
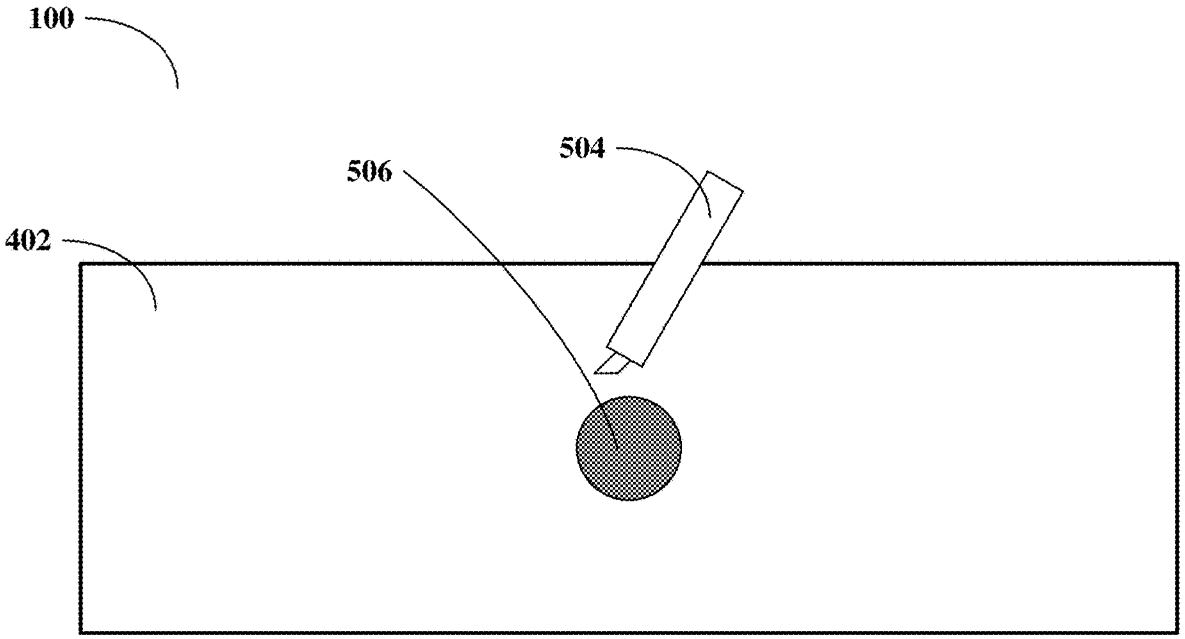
FIG. 5B is an overhead view of a lampshade insert device second side being drawn on via an artistic implement according to the principles of the present disclosure.

FIGS. 5A and 5B show designs as in 4A and 4B being drawn on. In FIG. 5A a first side 500 may have a pattern design 404 thereon. A user may color, draw, or otherwise mark a lampshade insert device with any number or type of artistic implements 504. Such implements may include markers, crayons, colored pencils, liquid chalk markers, dry erase markers, or other such implements. A user may draw any artistic medium 506 on the insert, or color within the shapes or lines of the design printed on one side. The ink, liquid chalk, dry erase ink, or other artistic medium 506 created by the artistic implement 504 may be removed from the lampshade insert device 100 by dry erase or wet erase means, as desired, depending on the artistic implement 504 used. FIG. 5B shows a second side 502 that may not have a design, but may still be drawn on, colored on, or otherwise marked with an artistic implement 504 to produce an artistic medium 506.

Figure 6A:
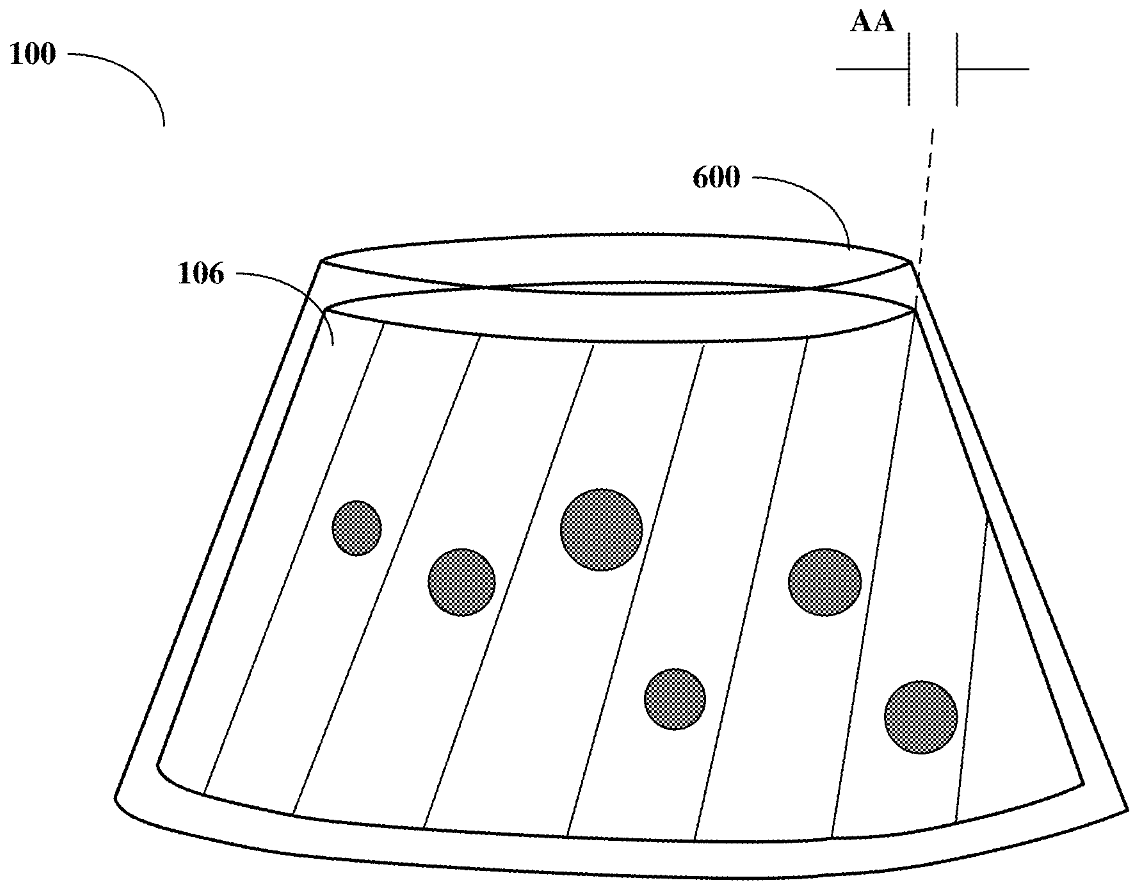
FIG. 6A is a perspective view of a lampshade insert device interacting with a transparent view of a lampshade according to the principles of the present disclosure.

FIG. 6A shows a lampshade insert device 100 disposed within a lampshade 600, retaining a three-dimensional shape 106 therein. The lampshade insert device 100 may have a thickness AA of 0.170 mm to 0.220 mm in some implementations, while other measurements are contemplated for other implementations where more or less rigidity may be preferred, depending on the need. For example, other lampshade insert device inserts may range from 0.100 mm to 0.170 mm, or 0.220 to 0.300 mm. A different thickness may be selected to suit whatever rigidity or translucence needs an individual may have.

Figure 6B:
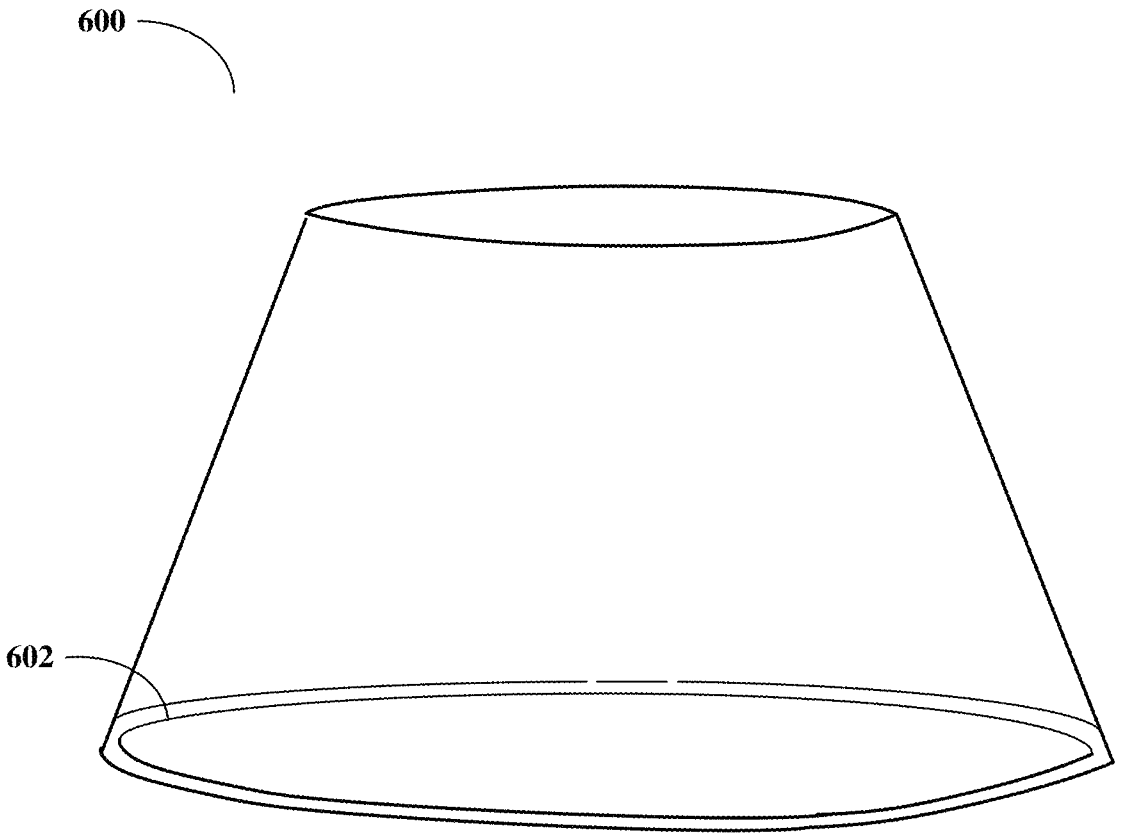
FIG. 6B is a perspective view of a lampshade featuring a lip disposed along a bottom edge of the lampshade according to the principles of the present disclosure.

In some implementations, a lampshade as in FIG. 6 may have a channel or groove for receiving a lower edge of a lampshade insert. The channel or groove may provide a gap between the lampshade and a lip. The lip may extend from a base wire or ring so that there is a groove for receiving the lower edge of a lampshade insert. In some implementations, a lip may be formed of a cloth, rigid plastic, metal, or other material. In other implementations, a lampshade may not have a lip, and instead rely on resistance to manipulation of the lampshade insert device to retain the lampshade insert device within the lampshade, such that friction created between one side of the lampshade insert device and an interior of the lampshade causes the lampshade insert device to be secured to the lampshade. In some implementations a lampshade insert device may have a plurality of small hooks disposed along a length of an edge, such that the lampshade insert device may hook onto a top edge of a lampshade and hang from that edge by the plurality of hooks.

Figure 7:
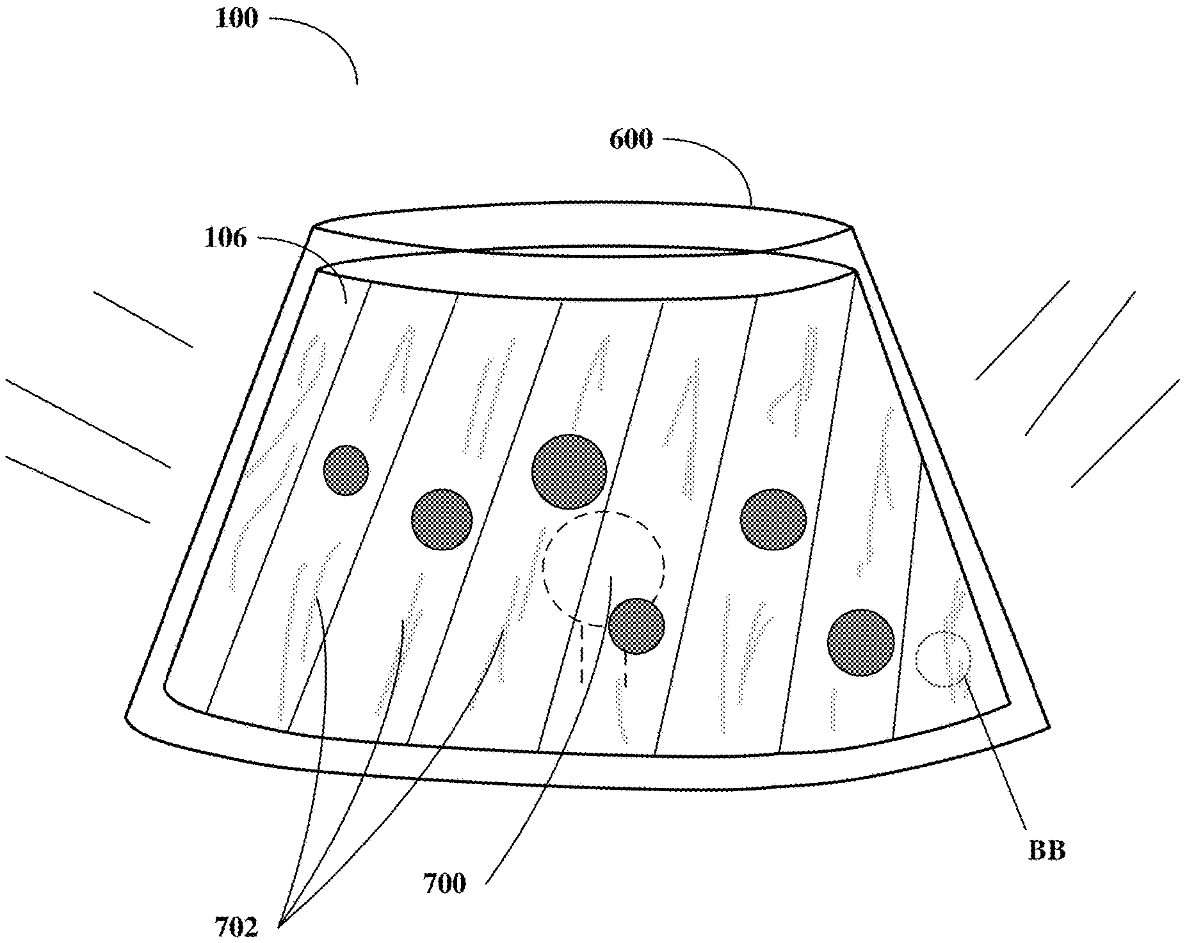
FIG. 7 is a perspective view of a lampshade insert device interacting with a transparent view of a lampshade with a light source within according to the principles of the present disclosure.

FIG. 7 shows a lampshade insert device 100 disposed within a lampshade 600, retaining a three-dimensional shape 106 therein, surrounding a light source 700. The insert of the lampshade insert device 100 may be opaque, transparent, or semi-transparent. In some implementations, the insert may have a frosted or other obscuring finish 702 so that it is not fully transparent but allows some amount of light to pass through. A semi-transparent insert or frosted finish 702 may allow some light to pass through without allowing excessive brightness or glare in a user's eyes. The insert may translucent or may be fully transparent and some opacity may be provided by a design printed on the insert. In some implementations, an insert of a lampshade insert device 100 may have a gloss or finish rating BB of 98 Gloss Units (GU) to 103 GU. In other implementations an insert may have a rating of 90 GU to 98 GU. In yet other implementations an insert may have a gloss rating BB from 103 GU to 110 GU. Any number of ratings of transparencies or finishes may be selected to suit a variety of translucence or opacity needs.

The insert may be sized to be accommodated by a printer. For example, commercial printers with a large printing size may be used to allow for designs and patterns large enough to form a lampshade cover may be used. The lampshade insert device 100 may be made of a thermoplastic material in some implementations and may have enough heat resistance to withstand exposure to lightbulbs and comparable light sources for extended periods of time. The lampshade insert device may thereby retain structural integrity both of the thermoplastic material and the design thereon and prevent damage to either.

Figure 8:
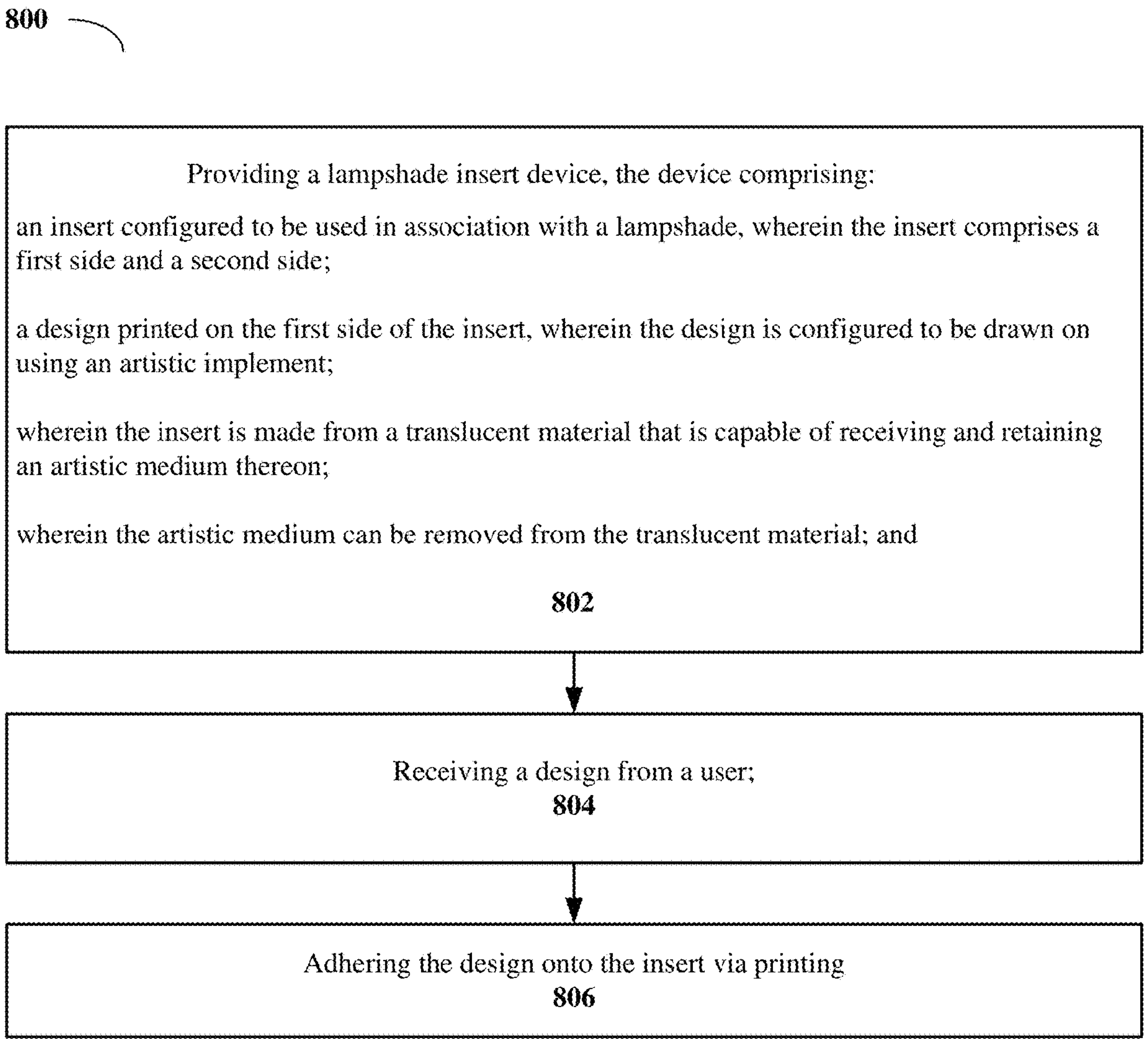
FIG. 8 is a schematic flow chart diagram illustrating a method for using a lampshade insert device according to the principles of the present disclosure.

FIG. 8 shows a flow diagram 800 of method steps of using a lampshade insert device. The steps may include providing a lampshade insert device at 802. The device may comprise an insert configured to be used in association with a lampshade, wherein the insert comprises a first side and a second side. The device may include a design printed on the first side of the insert, wherein the design is configured to be drawn on using an artistic implement. The insert may be made from a translucent material that is capable of receiving and retaining an artistic medium thereon. The artistic medium can be removed from the translucent material. The method may further include using an artistic implement to apply an artistic medium to the lampshade insert device at 804. The method may also include providing, by a user, a design 804, which may then be adhered to the design via printing 806.

Figure 9:
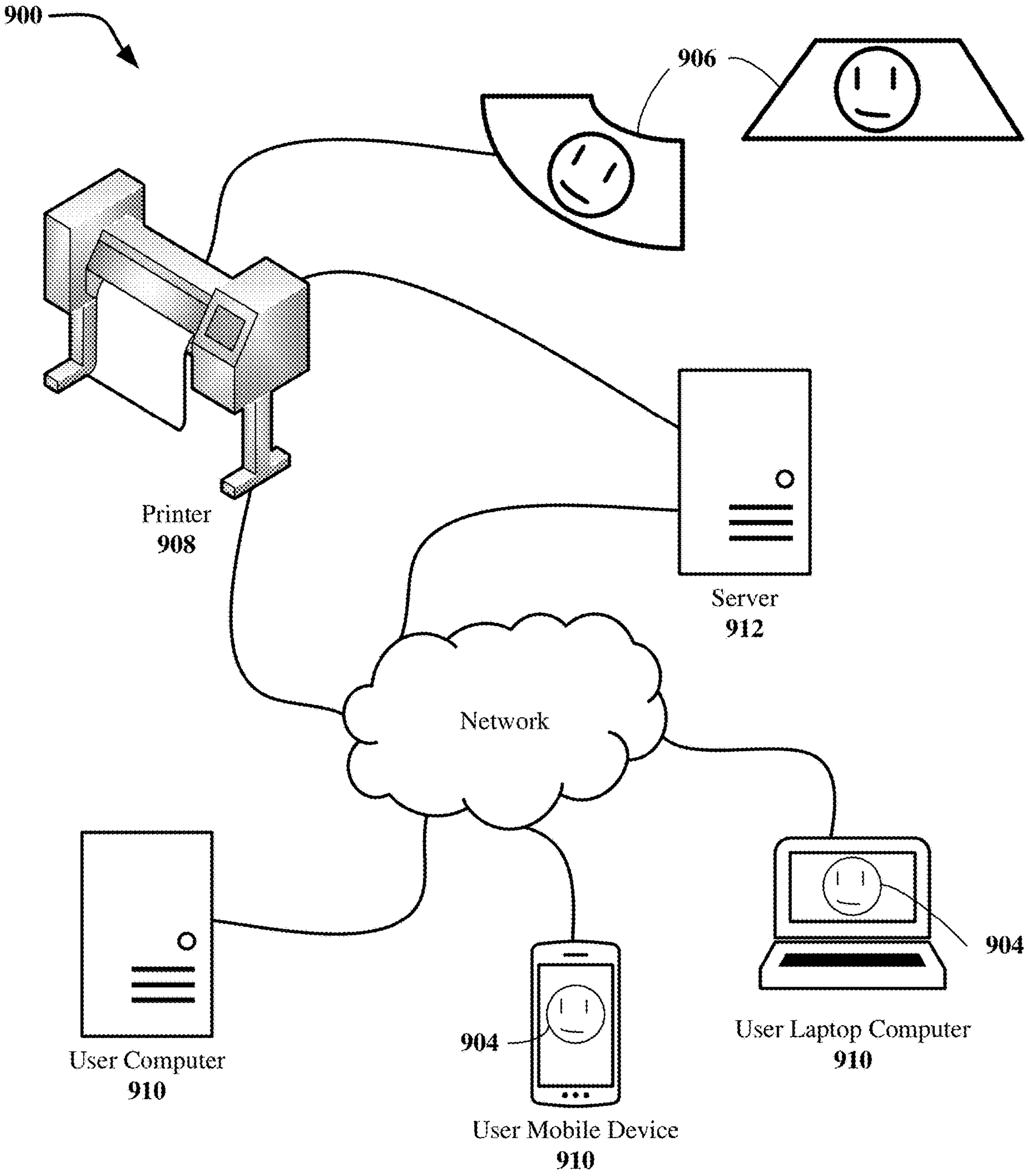
FIG. 9 is a diagram a system and method of adhering a design onto a lampshade insert device via printing according to the principles of the present disclosure.

FIG. 9 shows a depiction of a system and method of sending a design from a user to a server to produce a lampshade insert device having a design printed thereon. A user may provide a design 904 via personal computer, mobile phone, or other computing device 910 to a server 912. The design 904 may be received by the server 912 and sent over a network to a printer 908, or in some instances sent directly by a user device 910 from a user to a printer 908. The printer 908 may print the design 904 to onto a blank lampshade insert device 100 to produce an insert having the design adhered thereon 906. In some implementations the printing process may be latex printing. In others it may be UV printing, traditional solvent ink printing, or other printing processes.

Figure 10:
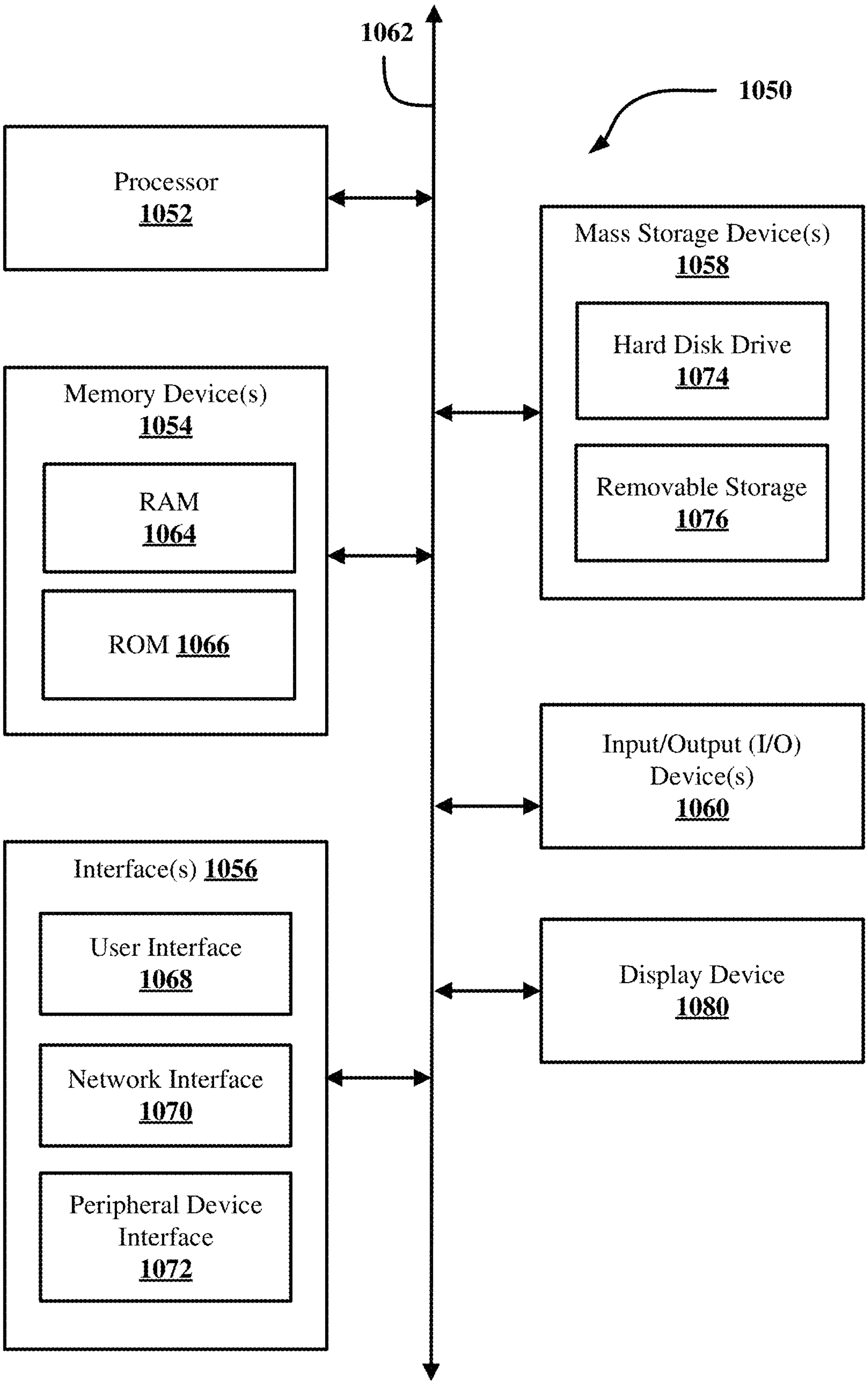
FIG. 10 is a schematic view of computing system hardware.

As illustrated in FIG. 10, implementations of the present disclosure may comprise or utilize a special purpose or general-purpose computer, including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. In an implementation, a sensor and camera control unit may be networked to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above-mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 10 is a block diagram illustrating an example computing device 1050. Computing device 1050 may be used to perform various procedures, such as those discussed herein. Computing device 1050 can function as a server, a client, or any other computing entity. Computing device 1050 can perform various monitoring functions as discussed herein, and can execute one or more application programs, such as the application programs described herein. Computing device 1050 can be any of a wide variety of computing devices, such as a desktop computer, a notebook computer, a server computer, a handheld computer, camera control unit, tablet computer and the like.

Computing device 1050 includes one or more processor(s) 1052, one or more memory device(s) 1054, one or more interface(s) 1056, one or more mass storage device(s) 1058, one or more Input/Output (I/O) device(s) 1060, and a display device 1080 all of which are coupled to a bus 1062. Processor(s) 1052 include one or more processors or controllers that execute instructions stored in memory device(s) 1054 and/or mass storage device(s) 1058. Processor(s) 1052 may also include various types of computer-readable media, such as cache memory.

Memory device(s) 1054 include various computer-readable media, such as volatile memory (e.g., random access memory (RAM) 1064) and/or nonvolatile memory (e.g., read-only memory (ROM) 1066). Memory device(s) 1054 may also include rewritable ROM, such as Flash memory.

Mass storage device(s) 1058 include various computer readable media, such as magnetic tapes, magnetic disks, optical disks, solid-state memory (e.g., Flash memory), and so forth. As shown in FIG. 10, a particular mass storage device is a hard disk drive 1074. Various drives may also be included in mass storage device(s) 1058 to enable reading from and/or writing to the various computer readable media. Mass storage device(s) 1058 include removable media 1076 and/or non-removable media.

I/O device(s) 1060 include various devices that allow data and/or other information to be input to or retrieved from computing device 1050. Example I/O device(s) 1060 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 1080 includes any type of device capable of displaying information to one or more users of computing device 1050. Examples of display device 1080 include a monitor, display terminal, video projection device, and the like.

Interface(s) 1006 include various interfaces that allow computing device 1050 to interact with other systems, devices, or computing environments. Example interface(s) 1056 may include any number of different network interfaces 1070, such as interfaces to local area networks (LANs), wide area networks (WANs), wireless networks, and the Internet. Other interface(s) include user interface 1068 and peripheral device interface 1072. The interface(s) 1056 may also include one or more user interface elements 1068. The interface(s) 1056 may also include one or more peripheral interfaces such as interfaces for printers, pointing devices (mice, track pad, etc.), keyboards, and the like.

Bus 1062 allows processor(s) 1052, memory device(s) 1054, interface(s) 1056, mass storage device(s) 1058, and I/O device(s) 1060 to communicate with one another, as well as other devices or components coupled to bus 1062. Bus 1062 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1050, and are executed by processor(s) 1052. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

Additional steps of the method may include manipulating the lampshade insert device into a three-dimensional shape and disposing it within a lampshade. Further steps may include removing the lampshade insert device from within the lampshade. The method may also include manipulating the lampshade insert device into a two-dimensional shape and removing the artistic medium from the lampshade insert device.

In one implementation, devices and systems disclosed herein may be used with standardized sizes. For example, lamps, lampshade covers, and support members (e.g., transparent lampshades) may be manufactured and labeled in a plurality of predetermined sizes; for example, small, medium, large, kid sizes, and the like. In one implementation, a lampshade insert device may provide a systemic lampshade frame having peripheral top and bottom flanges dimensioned and adapted to secure a systemic shade wrap or cover without tools, such as that illustrated in FIG. 6. The lampshade system may include a color-coded format or a logo and branding format allowing users to easily identify the predetermined size of the plurality of components of the lampshade wrap or cover system.

EXAMPLES

The following examples pertain to further embodiments.

Example 1 is a device. The device comprises an insert configured to be used in associate with a lampshade, wherein the insert comprises a first and a second side; a design located on the first side of the insert, wherein the insert with the design is configured to be drawn on using an artistic implement; wherein the insert is made from a translucent material that is capable of receiving and retaining an artistic medium thereon; wherein the artistic medium can be removed from the translucent material; and wherein the design is exposed for viewing in association with the lampshade when the insert is in a three-dimensional shape.

Example 2 is a device as in claim 1, wherein the first side and the second side have dry erase properties.

Example 3 is a device as in any of claims 1-2, wherein the first side and the second side have wet erase properties.

Example 4 is a device as in any of claims 1-3, wherein the insert further comprises a two-dimensional shape in an unmanipulated state.

Example 5 is a device as in any of claims 1-4, wherein the three-dimensional shape is created by manipulating the insert into the three-dimensional shape, and wherein the three-dimensional shape is congruent with a shape in association with the lampshade.

Example 6 is a device as in any of claims 1-5, wherein the insert comprises a thickness such that the insert resists manipulation to a different shape, such that the three-dimensional shape of the insert in association with the lampshade is retained by fiction.

Example 7 is a device as in any of claims 1-6, wherein the thickness is substantially uniform and ranges from about 0.170 millimeters to about 0.220 millimeters.

Example 8 is a device as in any of claims 1-7, wherein the translucent material of the insert comprises a gloss level from about 98 Gloss Units to about 108 Gloss Units.

Example 9 is a device as in any of claims 1-8, wherein the translucent material further comprises an obscuring finish.

Example 10 is a device as in any of claims 1-9, wherein the insert further comprises a thermoplastic material.

Example 11 is a device as in any of claims 1-10, wherein the insert further comprises a semi-rigid material.

Example 12 is a device as in any of claims 1-11, wherein the design is printed on the first side of the insert by heat transfer film printing.

Example 13 is a device as in any of claims 1-12, wherein the insert further comprises a first end and a second end, wherein the first end has a fastener protrusion, and a second end has a fastener slot.

Example 14 is a device as in any of claims 1-13, wherein the two-dimensional shape of the insert has a substantially rectangular shape.

Example 15 is a device as in any of claims 1-14, wherein the two-dimensional shape of the insert has a substantially partially-annular shape.

Example 16 is a system. The system comprises a lampshade and a lampshade insert device. The lampshade insert device comprises an insert configured to be used in association with a lampshade, wherein the insert comprises a first side and a second side; a design located on the first side of the insert, wherein the insert with the design is configured to be drawn on using an artistic implement; wherein the insert is made from a translucent material that is capable of receiving and retaining an artistic medium thereon; wherein the artistic medium can be removed from the translucent material; and wherein the design is exposed for viewing in association with the lampshade when the insert is in a three-dimensional shape.

Example 17 is a system as in claim 16, wherein the first side of the lampshade insert device and the second side of the lampshade insert device have dry erase properties.

Example 18 is a system as in any of claims 16-17, wherein the first side of the lampshade insert device and the second side of the lampshade insert device have wet erase properties.

Example 19 is a system as in any of claims 16-18, wherein the insert of the lampshade insert device further comprises a two-dimensional shape in an unmanipulated state.

Example 20 is a system as in any of claims 16-19, wherein the three-dimensional shape of the insert of the lampshade insert device is created by manipulating the insert into the three-dimensional shape, and wherein the three-dimensional shape is congruent with a shape in association with the lampshade.

Example 21 is a system as in any of claims 16-20, wherein the insert of the lampshade insert device comprises a thickness such that the insert resists manipulation to a different shape, such that the three-dimensional shape of the insert in association with the lampshade is retained by friction.

Example 22 is a system as in any of claims 16-21, wherein the thickness of the insert of the lampshade insert device is substantially uniform and ranges from about 0.170 millimeters to about 0.220 millimeters.

Example 23 is a system as in any of claims 16-22, wherein the translucent material of the lampshade insert device comprises a gloss level from about 98 Gloss Units to about 108 Gloss Units.

Example 24 is a system as in any of claims 16-23, wherein the translucent material further comprises an obscuring finish.

Example 25 is a system as in any of claims 16-24, wherein the insert of the lampshade insert device further comprises a thermoplastic material.

Example 26 is a system as in any of claims 16-25, wherein the insert of the lampshade insert device further comprises a semi-rigid material.

Example 27 is a system as in any of claims 16-26, wherein the design of the lampshade insert device is printed on the first side of the insert by heat transfer film printing.

Example 28 is a system as in any of claims 16-27, wherein the insert of the lampshade insert device further comprises a first end and a second end, wherein the first end comprises a fastener protrusion and the second end comprises a fastener slot.

Example 29 is a system as in any of claims 16-28, wherein the two-dimensional shape of the insert has a substantially rectangular shape.

Example 30 is a system as in any of claims 16-29, wherein the two-dimensional shape of the insert has a substantially partially-annular shape.

Example 31 is a method for printing a lampshade insert device. The steps comprise providing a lampshade insert device, the device comprising an insert configured to be used in association with a lampshade, wherein the insert comprises a first side and a second side; a design located on the first side of the insert, wherein the insert with the design is configured to be drawn on using an artistic implement; wherein the insert is made from a translucent material that is capable of receiving and retaining an artistic medium thereon; wherein the artistic medium can be removed from the translucent material; receiving a design from a user; and adhering the design onto the insert via printing.

Example 32 is a method as in example 31, wherein the steps further comprise applying an artistic medium to the lampshade insert device via an artistic implement; manipulating the lampshade insert device into a three-dimensional shape; and disposing the lampshade insert device within a lampshade.

Example 33 is a method as in any of examples 31-32, wherein the steps further comprise removing the lampshade insert device from within the lampshade; manipulating the lampshade insert device into a two-dimensional shape; and removing the artistic medium from the lampshade insert device.

Example 34 is a method as in any of examples 31-33, wherein the steps further comprise a server receiving a design input from a user over a network, providing the design input to a printer over the network, and printing the design onto a lampshade insert device.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A customizable lampshade system, the system comprising:
- a lampshade; and
- a lampshade insert, comprising:
  - a first side and a second side,
  - a design printed on the first side of the lampshade insert, wherein the design is printed on the first side of the lampshade insert such that the design comprises a surface that is raised and textured relative to the first side of the lampshade insert, and
  - an artistic medium applied to the design of the lampshade insert by an artistic implement,
  - wherein the lampshade insert is made from a thermoplastic material that is translucent and heat-resistant;
  - wherein the thermoplastic material of the lampshade insert is sufficiently heat-resistant such that heat from a light bulb does not damage the artistic medium,
  - wherein the artistic medium is removable by dry erase or wet erase means;
- wherein the lampshade comprises a frustoconical shape;
- wherein the lampshade insert is sized to be inserted into an opening of the lampshade and rest within an interior of the lampshade;
- wherein the lampshade is made from a clear plastic material such that the lampshade insert is exposed for viewing when inserted into the lampshade;
- wherein the material of the lampshade insert is sufficiently semi-rigid such that the material resists manipulation from a substantially flat shape into a three-dimensional shape; and
- wherein the lampshade insert is secured to the interior of the lampshade via friction created from the first side of the lampshade insert and the raised and textured surface of the design coming into contact with the interior of the lampshade.

2. The system of claim 1, wherein the lampshade insert is made from a dry erasable material.

3. The system of claim 1, wherein the lampshade insert is made from a wet erasable material.

4. The system of claim 1, wherein the substantially flat shape is a default state of the lampshade insert when the lampshade insert is in an unmanipulated state.

5. The system of claim 4, wherein the substantially flat shape of the lampshade insert is a substantially partially-annular shape.

6. The system of claim 1, wherein the three-dimensional shape is created by manipulating the lampshade insert into the three-dimensional shape, and wherein the three-dimensional shape is congruent with the shape of the lampshade.

7. The system of claim 1, wherein the lampshade insert comprises a thickness such that the lampshade insert resists manipulation to a different shape, and such that the three-dimensional shape of the lampshade insert creates friction in association with the lampshade by the lampshade insert attempting to return to the substantially flat shape.

8. The system of claim 7, wherein the thickness of the lampshade insert is substantially uniform and ranges from about 0.170 millimeters to about 0.220 millimeters.

9. The system of claim 1, wherein the translucence of the lampshade insert comprises a gloss level from about 98 Gloss Units to about 108 Gloss Units.

10. The system of claim 9, wherein the translucent material further comprises an obscuring finish.

11. The system of claim 1, wherein the design is printed on the first side of the lampshade insert by heat transfer film printing.

12. The system of claim 1, wherein the lampshade insert further comprises a first end and a second end, wherein the first end has a fastener protrusion, and the second end has a fastener slot.

13. The system of claim 1, wherein the design is an additive three-dimensionally printed design, such that the design is raised from the first side of the lampshade insert to create a three-dimensional effect.

14. The system of claim 1, wherein the lampshade further comprises a lip on a bottom edge of the lampshade, and wherein the lip comprises a channel sized to receive a bottom edge of the lampshade insert.

15. The system of claim 1, wherein the design is a lenticularly printed design such that the design has a holographic effect when observed.

16. A customizable lampshade insert system, the system comprising:

a lampshade; and a lampshade insert, the insert comprising:

a first side and a second side, a design printed on the first side of the lampshade insert, wherein the design is printed on the first side of the lampshade insert such that the design comprises a surface that is raised and textured relative to the first side of the lampshade insert, and an artistic medium applied to the design of the lampshade insert by an artistic implement, wherein the lampshade insert is made from a thermoplastic material that is translucent and heat-resistant, wherein the thermoplastic material of the lampshade insert is sufficiently heat-resistant such that heat from a light bulb does not damage the artistic medium, wherein the artistic medium is removable by dry erase or wet erase means;

wherein the lampshade comprises a drum shape;

wherein the lampshade is made from a clear plastic material;

wherein the lampshade insert is sized to be inserted into an opening of the lampshade and rest within an interior of the lampshade;

wherein the lampshade is made from a clear plastic material such that the lampshade insert is exposed for viewing when inserted into the lampshade;

wherein the material of the lampshade insert is sufficiently semi-rigid such that the material resists manipulation from a flat shape into a three-dimensionally folded shape; and wherein the lampshade insert is secured to the interior of the lampshade via friction created from the first side of the lampshade insert and the raised and textured surface of the design coming into contact with the interior of the lampshade.

17. The system of claim 16, wherein the lampshade insert is made from dry erasable material.

18. The system of claim 16, wherein the lampshade insert is made from wet erasable material.

19. The system of claim 16, wherein the substantially flat shape is a default state of the lampshade insert when the lampshade insert is in an unmanipulated state.

20. The system of claim 19, wherein the substantially flat shape of the insert is a substantially rectangular shape.

21. The system of claim 16, wherein the three-dimensional shape of the lampshade insert is created by manipulating the lampshade insert into the three-dimensional shape, and wherein the three-dimensional shape is congruent with the shape of the lampshade.

22. The system of claim 16, wherein the lampshade insert comprises a thickness such that the lampshade insert resists manipulation to a different shape, and such that the three-dimensional shape of the lampshade insert creates friction in association with the lampshade by the lampshade insert attempting to return to the substantially flat shape.

23. The system of claim 22, wherein the thickness of the insert of the lampshade insert is substantially uniform and ranges from about 0.170 millimeters to about 0.220 millimeters.

24. The system of claim 16, wherein the translucence of the lampshade insert comprises a gloss level from about 98 Gloss Units to about 108 Gloss Units.

25. The system of claim 24, wherein the material of the lampshade insert further comprises an obscuring finish.

26. The system of claim 16, wherein the design of the lampshade insert is printed on the first side of the lampshade insert by heat transfer film printing.

27. The system of claim 16, wherein the lampshade insert further comprises a first end and a second end, wherein the first end comprises a fastener protrusion and the second end comprises a fastener slot.

28. The system of claim 16, wherein the design is an additive three-dimensionally printed design, such that the design is raised from the first side of the lampshade insert to create a three-dimensional effect.

29. The system of claim 16, wherein the lampshade further comprises a lip on a bottom edge of the lampshade, and wherein the lip comprises a channel sized to receive a bottom edge of the lampshade insert.

30. The system of claim 16, wherein the design is a lenticularly printed design such that the design has a holographic effect when observed.

* * * * *